2 Sheets—Sheet 1

J. H. C. MARTIN.
Rice-Cleaning Apparatus.

No. 207,881.     Patented Sept. 10. 1878.

Attest:
Chas. J. Gooch
L. L. Smallwood Jr.

Inventor:
James H. C. Martin,
By Knight Bros
Attys

2 Sheets—Sheet 2

J. H. C. MARTIN.
Rice-Cleaning Apparatus.

No. 207,881. Patented Sept. 10, 1878.

Attest:
Chas. J. Gooch
G. T. Smallwood Jr.

Inventor:
James H. C. Martin
By Knight Bros
Attys.

UNITED STATES PATENT OFFICE.

JAMES H. C. MARTIN, OF THORNLEIGH, UPPER CLAPTON, ENGLAND.

IMPROVEMENT IN RICE-CLEANING APPARATUS.

Specification forming part of Letters Patent No. 207,881, dated September 10, 1878; application filed February 21, 1878; patented in England, November 7, 1877.

*To all whom it may concern:*

Be it known that I, JAMES HENRY CHANNING MARTIN, of Thornleigh, Upper Clapton, in the county of Middlesex, England, have invented new and useful Improvements in Means or Apparatus Employed in Husking and otherwise Decorticating and Polishing Rice and other kinds of grain and seeds, which improvements are fully set forth in the following specification.

The invention has for its object improvements in means or apparatus employed in husking and otherwise decorticating and polishing rice and other kinds of grain and seeds.

For this purpose I employ one or more segments of a hollow drum or cylinder, in combination with revolving cylindrical surfaces. The grain or seeds are fed into the space between the concave side of the segment or segments and the cylinder by means of a hopper along the entire length of the cylinder and segment or segments.

The segment or segments is or are adjusted at such a distance from the revolving cylinder as will suit the particular grain or seed under treatment, and the feed thereto is regulated according to the action of the cylinder, as no more grain or seed can be taken by the cylinder than the space between the cylinder and segment or segments will permit.

In order that my said invention may be more clearly understood and readily carried into effect, I will proceed, aided by the accompanying drawings, more fully to describe the same.

Figure 1:
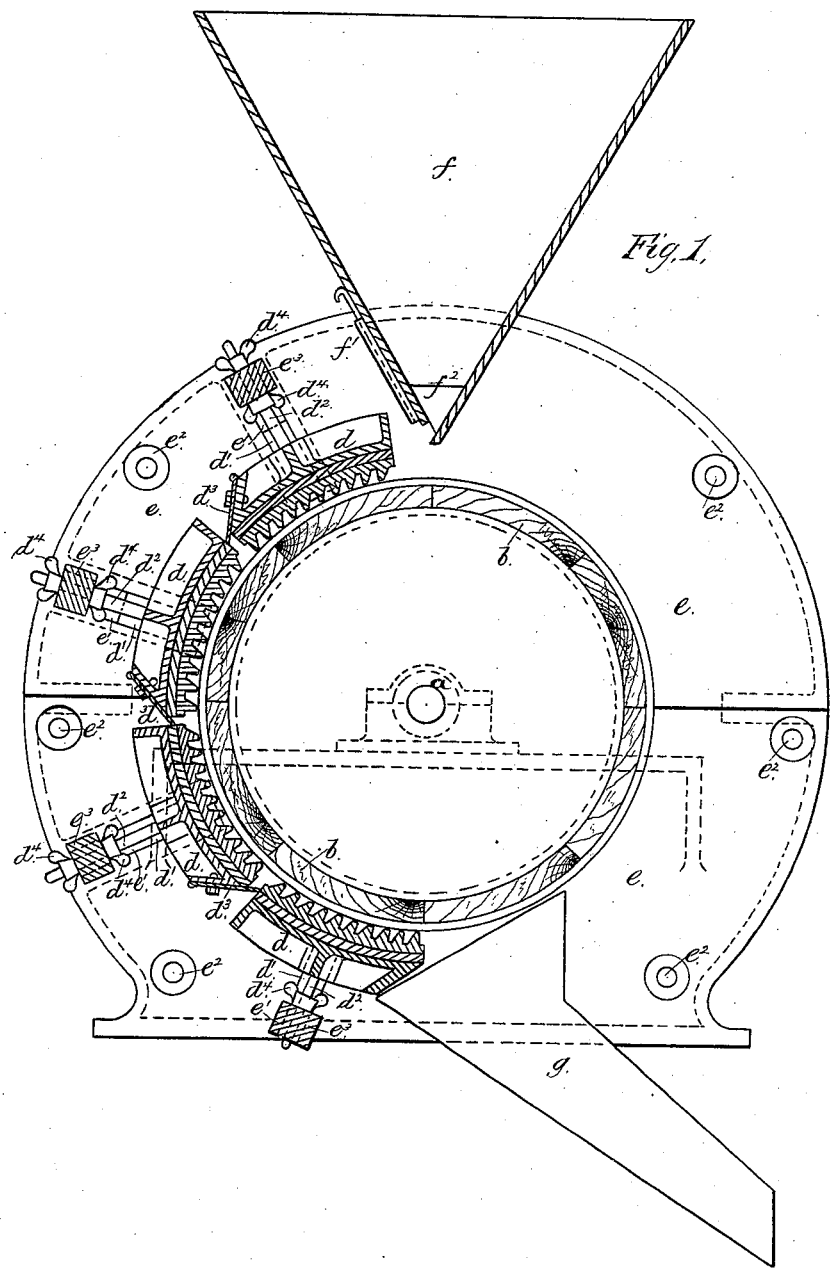
Figure 2:
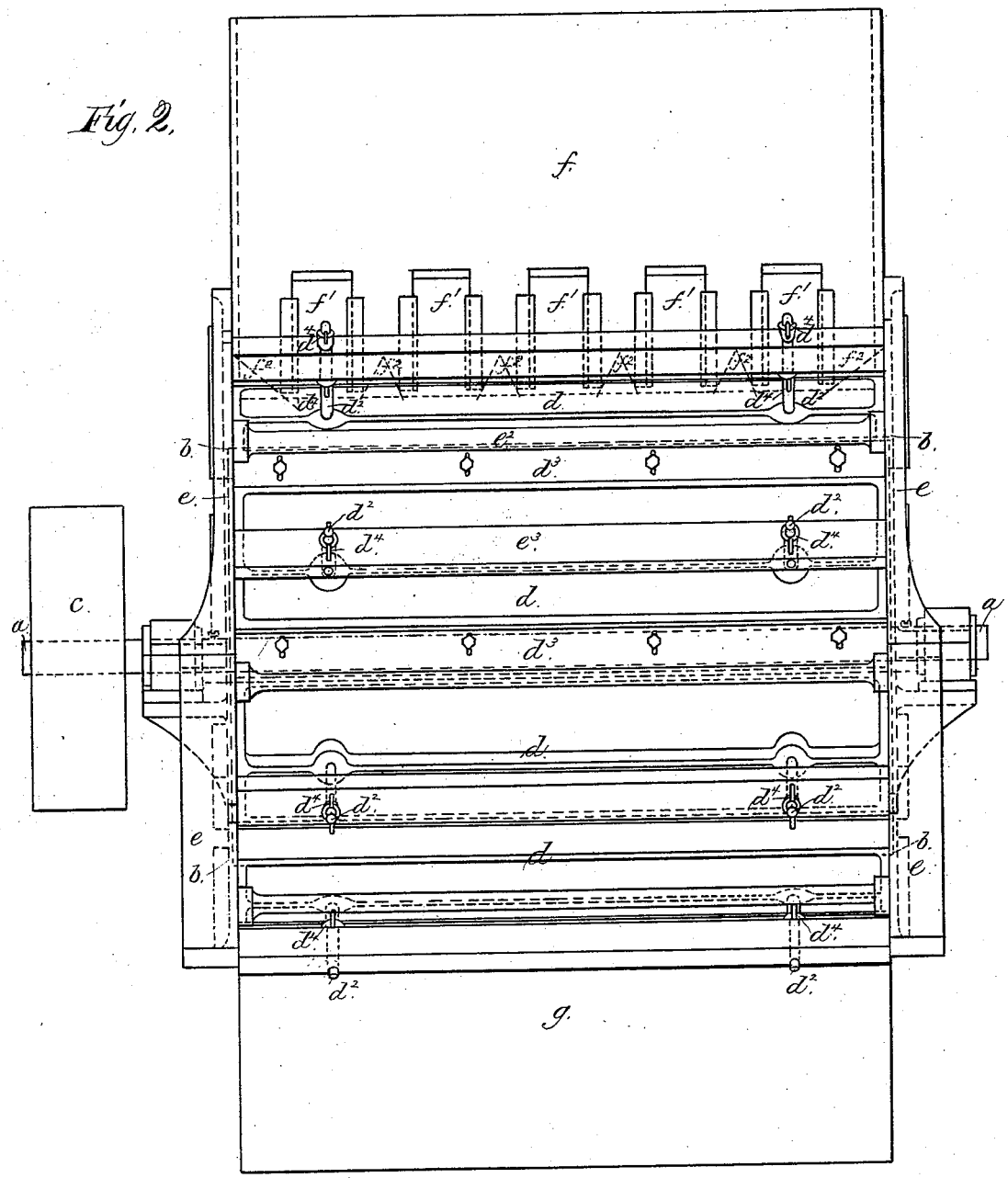

In the drawing, Figure 1 represents a cross-section, and Fig. 2 a side elevation, of machinery or apparatus constructed according to my invention for husking and otherwise decorticating and polishing rice and other grain and seeds.

$a$ is the driving-axis, upon which is fixed a cylinder, $b$, and driving-pulley $c$. This cylinder may be formed, as represented in the drawing, with a periphery of wood covered with an emery composition, or the surface thereof may be otherwise formed and of different materials. Around the cylinder I fix one or more segments, $d$, each of which is provided with projections $d^1$, which fit and are capable of sliding within grooves or ways $e^1$ formed in the end frames $e$. These end frames carry the bearings for the axis or shaft $a$, and are connected together by tie-rods $e^2$, which serve to maintain them at the required distance apart from each other. To these end frames $e$ are also fixed thrust-bars $e^3$, extending from frame to frame.

The segments $d$, as shown in the drawing, are formed of cast-iron frames covered on the concave side with wood, to which a vulcanized india-rubber frictional or rubbing surface is fixed; but they can be otherwise formed and provided with other descriptions of rubbing or frictional surfaces, as may be found desirable.

The segments $d$ are adjusted to and maintained at the required distance from the cylinder $b$ by means of screwed rods $d^2$, fixed into the backs thereof and passed through holes formed in the thrust-bars $e^3$, and acted upon by nuts $d^4$, as shown.

Slides $d^3$ are carried by the segments $d$, so as to completely close the spaces between them, as required, and thereby permit of adjustment for wear of the parts. $f$ is the hopper for supplying the grain or seed to be operated upon to the machine, and $f^1$ are a series of adjustable doors to the mouth of such hopper, to regulate the supply according to the speed at which the machine is driven. The spaces in the hopper $f$ between the doors $f^1$ are provided with inclined guides $f^2$, to guide the grain or seed to the openings. $g$ is a delivery-spout.

By these means the speed of the grain passing between the surfaces of the revolving drum or cylinder and the concave side of the segment or segments will be uniform over the whole working surface; therefore the friction or pressure applied will be equal on every grain or seed, and consequently a more rapid and perfect result will be obtained with less waste of the grain or seed acted upon, and at a less expense than that hitherto incurred for such purpose.

Having thus described the nature of my said invention, and the mode I have found to answer in carrying the same into effect, I would have it understood that what I claim is—

The combination of cylinder or drum $b$, segment or segments $d$, and hopper $f$, provided with doors $f^1$ and inclined guides $f^2$, and spout or chute $g$, in manner and for the purpose substantially as herein shown and described.

J. H. C. MARTIN.

Witnesses:
B. J. B. MILLS,
C. M. WHITE,
23 *Southampton Buildings, London.*